July 1, 1930.　　　G. A. SCOTT　　　1,768,864
POULTRY FEATHER PICKER
Filed April 13, 1928　　3 Sheets-Sheet 1
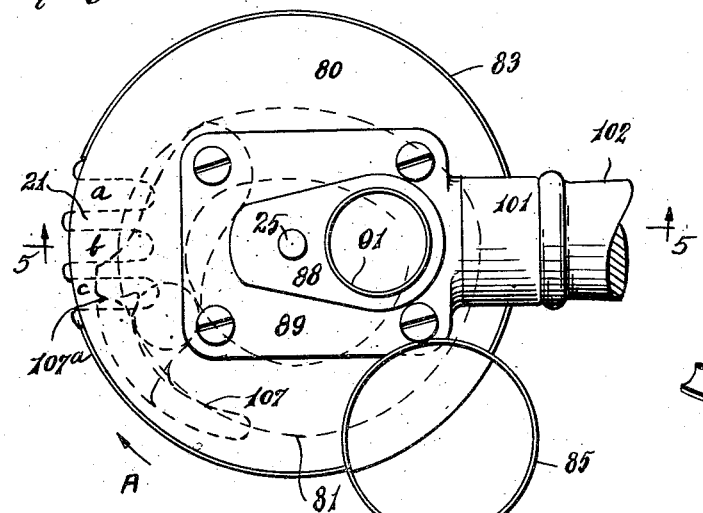
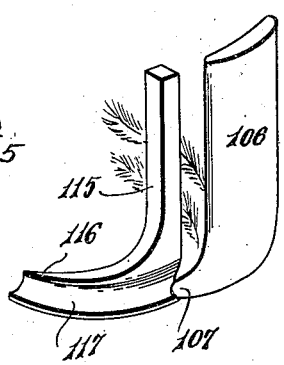
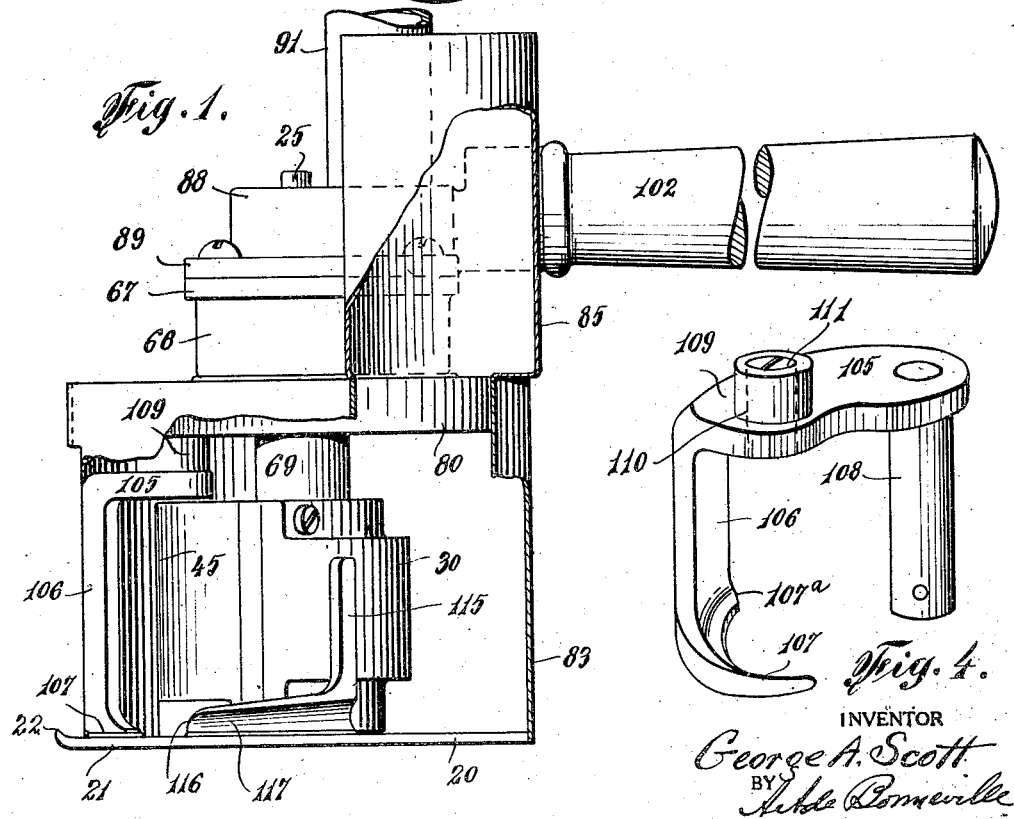
INVENTOR
George A. Scott
BY
ATTORNEY July 1, 1930.  G. A. SCOTT  1,768,864
POULTRY FEATHER PICKER
Filed April 13, 1928    3 Sheets-Sheet 2
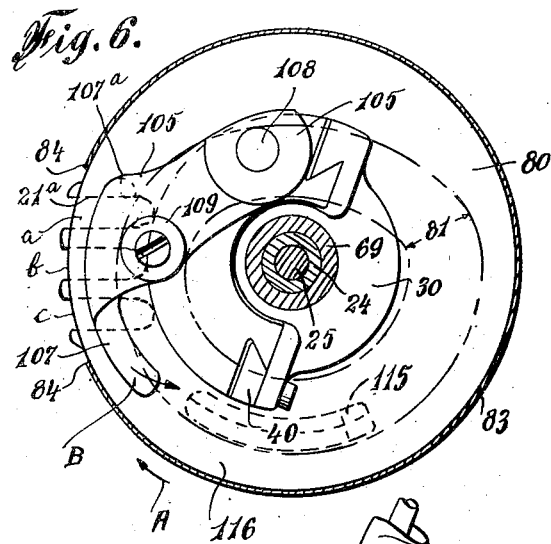
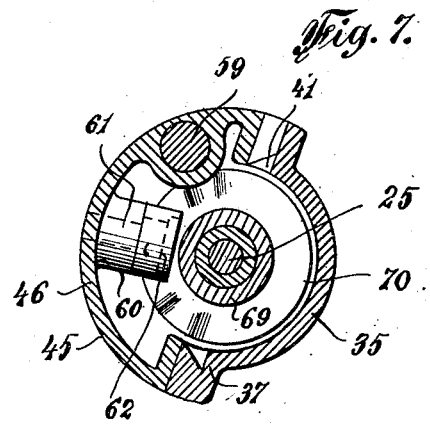
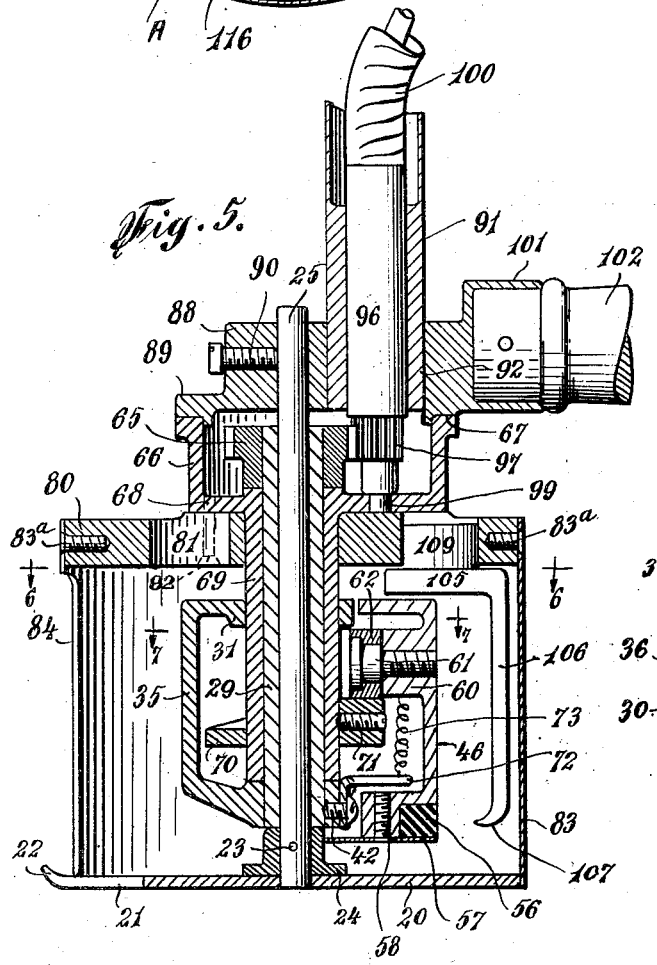
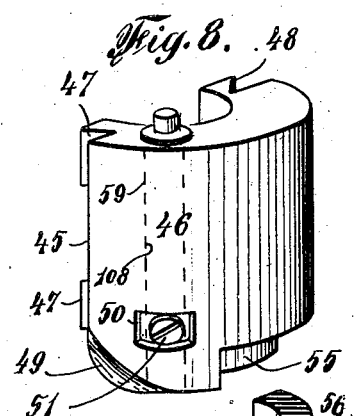
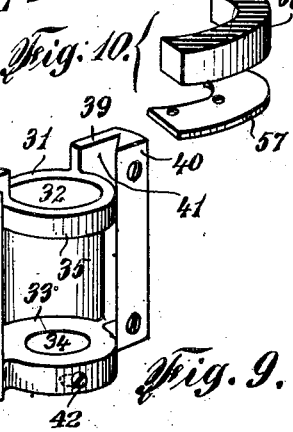
INVENTOR
George A. Scott
BY
ATTORNEY July 1, 1930.   G. A. SCOTT   1,768,864
POULTRY FEATHER PICKER
Filed April 13, 1928   3 Sheets-Sheet 3
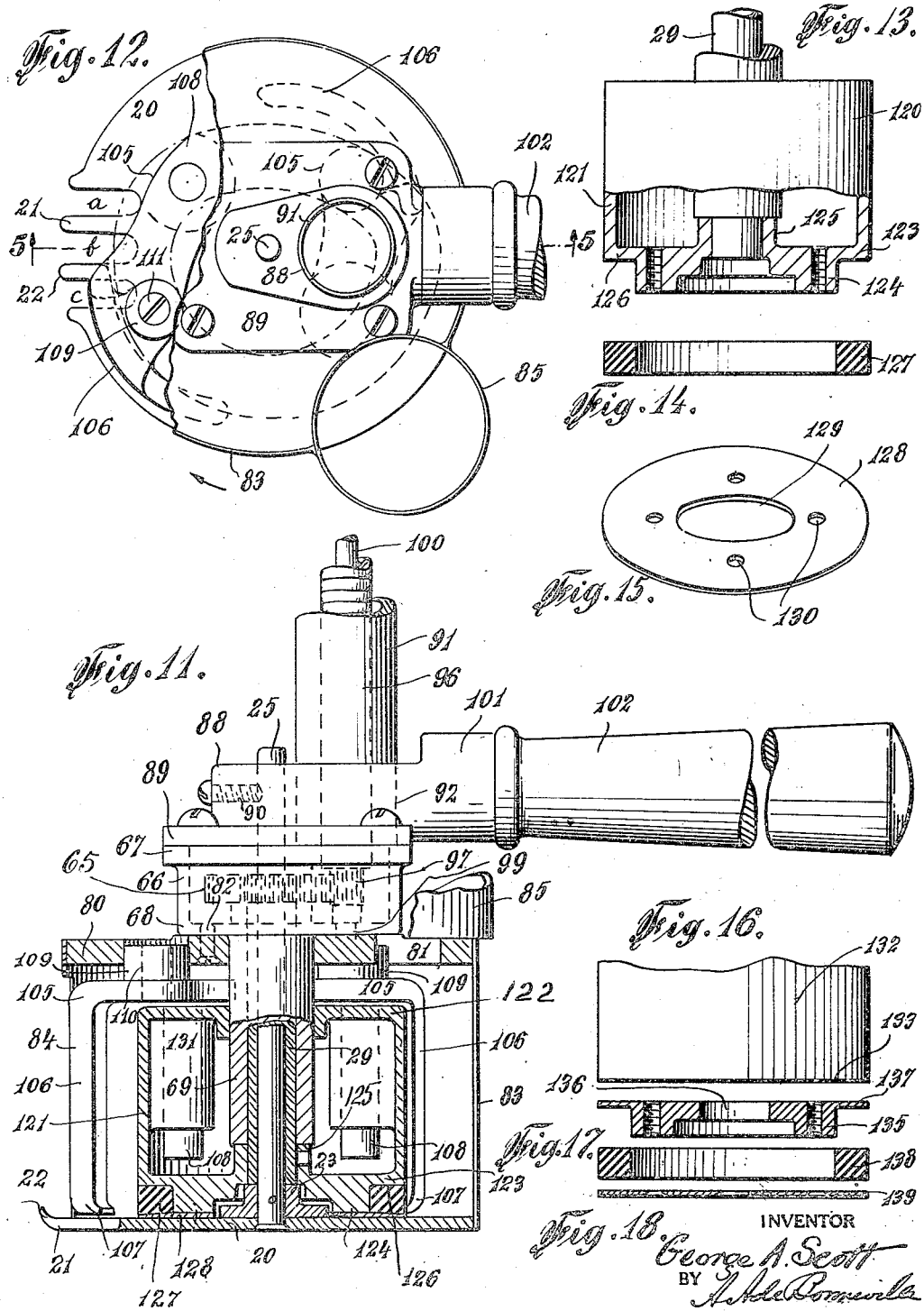

Patented July 1, 1930

1,768,864

UNITED STATES PATENT OFFICE

GEORGE A. SCOTT, OF BROOKLYN, NEW YORK, ASSIGNOR, BY MESNE ASSIGNMENTS, TO ATLAS FOWL PLUCKING MACHINE CORPORATION, A CORPORATION OF NEW YORK

POULTRY FEATHER PICKER

Application filed April 13, 1928. Serial No. 269,764.

This invention relates to a poultry feather picker.

The object of the invention is the production of a picker having elements that function in a manner very similar to hand picking, but more efficient. The second object of the invention is the production of a feather picker that grips feathers very close to the skin of a fowl operated upon. The third object of the invention is the production of a picker that preserves the skin of the fowl, preventing it being torn while the feathers are picked. The fourth object of the invention is the production of a picker, whereby the feathers plucked are maintained therein while being picked and then discharged therefrom to a predetermined place.

Fig. 1 shows an outside elevation partly in section of the poultry feather picker; Fig. 2 shows a top plan view of Fig. 1; Fig. 3 indicates a perspective fragmentary view of the stopper and gripper; Fig. 4 shows a perspective view of the gripper; Fig. 5 indicates a section of Fig. 2, on the line 5, 5; Fig. 6 shows a section of Fig. 5 on the line 6, 6; Fig. 7 is a section of Fig. 5 on the line 7, 7; Figs. 8 and 9 indicate perspective views of the drum of the picker; Fig. 10 shows perspective views of details; Fig. 11 shows an elevation of a modified form of the poultry feather picker and section as on the line 11, 11 of Fig. 12; Fig. 12 shows a top plan view of Fig. 11 partly broken away; Fig. 13 shows an elevation partly in axial section of the drum of the modified form of the picker; Fig. 14 shows a flexible ring for the drum in vertical section; Fig. 15 indicates a perspective view of a disc; Fig. 16 shows a fragmentary elevation of a further modification of the drum; Fig. 17 indicates vertical sections of a disc and a ring and Fig. 18 indicates a vertical section of a disc.

Referring to Figs. 1 to 10 inclusive the poultry feather picker in this exemplification is indicated with the circular comb plate 20, having the teeth 21 with the bent up front outer ends 22. A sleeve 23 having the flange 24 is supported upon and riveted to the said comb plate 20. A stem 25 has its lower end secured in the opening of the sleeve 23. A sleeve 29 encircles the stem 25.

The drum of the picker comprises a relatively stationary member indicated in its entirety by the numeral 30 and the movable member indicated in its entirety by the numeral 45. The member 30 comprises the upper disc 31 having the opening 32, and the lower disc 33, having the opening 34. The said discs are connected by the curved wall 35 which latter has integral therewith the stationary longitudinal guide 36, having the V shaped bearing 37. The discs have also formed therewith the stationary longitudinal guide 39, to which is adjustably connected the gib 40. The latter forming with the guide 39 the V shaped bearing 41. The stationary member 30 of the drum is fastened to the sleeve 29 by means of the screw 42.

The movable member 45 of the drum comprises practically the annular wall 46, which latter at its longitudinal edges and at the upper and lower ends thereof has formed therewith the V shaped guides 47 and 48, which respectively are in sliding engagement with the V shaped guides 37 and 41. One of the lower edges of the annular wall 46 is bent in as indicated at 49. The lower end of the wall 46 has the cut away portion 55, for the placement of the flexible segment 56, preferably of rubber. The said segment 56 is held in place by means of the metallic segment 57, which latter bears against the segment 56, and is fastened to the member 45 of the drum by means of the screws 58. A vertical bearing 59 is formed in the wall 46, and a boss 60 extends inwardly from the inner face of the wall 46. A journal screw 61 is supported in the boss 60 and has journaled thereon the roller 62. A spur gear 65 is fastened to the upper end of the sleeve 29.

A cylindrical housing 66 has formed at its upper end the annular flange 67, and at its lower end is formed the wall 68. The latter has extending therefrom the sleeve 69 which encircles the sleeve 29 and forms a bearing therefor. An annular cam 70 is fastened to the sleeve 69 by the screw 71. An arm 72 extends from the disc 33 and a spring 73 extends between the end of the arm 72 and the boss 60. A plate 80 has formed therewith the cam groove 81 and is fastened to the wall 68 by means of the screws 82 one of which is shown. A shell 83 has its upper end fastened to the plate 80 by means of the screws 83ª and extends over the comb plate 20. The longitudinal ends of the shell 83 are indicated at 84 and form an inlet opening. A cylindrical discharge duct 85 extends up from the shell 83.

A supporting cover is indicated in its entirety by the numeral 88, and has formed therewith the flange 89, which is fastened to the flange 67. The stem 25 extends through the cover 88 and is held in place by means of the screw 90. A sleeve 91 has its lower end forced into an opening 92 in the cover 88. A driving shaft 96 is rotatively supported in the sleeve 91, and has formed at its lower end the pinion 97 which meshes with the spur gear 65. A projection 99 formed below the pinion 97 is journaled in the wall 68. A flexible shaft 100 is fastened to the driving shaft 96. The supporting cover 88 has formed therewith the sleeve 101 for the handle 102.

The gripper shown in detail in Fig. 4 comprises the disc 105 from which extends the gripper proper 106. The latter has formed therewith the foot 107, which is concentric with the drum in one of its positions. A spindle 108 extends from and below the disc 105, and at the upper face of said disc is journaled a roller 109 on the journal pivot 110. A screw 111 holds the roller 109 in place.

The spindle 108 is supported in the bearing 59 of the wall 46 of the movable member 45, and is held in place by the collet 50 and the screw 51.

A stopper, for detail see Fig. 3, comprises the vertical member 115 which has formed therewith the foot 116 concentric with the drum of the picker. One side of the foot 116 has formed therein the clearance groove 117, and said foot is fastened to the comb plate 20 by being riveted thereto.

Referring to Figs. 11 to 18 inclusive, which show a modification of the picker, the comb plate is again shown at 20 with its teeth 21 having the ends 22, the sleeve 23 is again shown connected to the comb plate, and the stem is again indicated at 25. The drum in this modification is indicated in its entirety by the numeral 120, and consists of only one member which is in the form of a shell, having the cylindrical wall 121, top wall 122 and the bottom wall 123 with the projecting disc 124, and the sleeve 125. The disc 124 forms with the drum the shoulder 126. A ring of flexible material 127, see Fig. 14, preferably of rubber, encircles the disc 124 and bears between the annular disc 128 and the shoulder 126. The disc 128 has the central opening 129 and the openings 130. The latter are for screws which are in threaded engagement with the shouldered portion of the drum. The sleeve 29 has its lower end inserted into the sleeve 125 and is fastened thereto. A bearing 131 similar to 59 is formed with the wall 121 of the drum. The spur gear 65 is fastened to the upper end of the sleeve 29 as before. Referring to Figs. 16, 17 and 18, a further modification of the drum is indicated at 132 having the flat bottom 133. An annular disc 135 having a central opening 136 and the upper flange 137, is located with its flange 137 bearing against the flat bottom 133 of the drum 132. The annular ring of flexible material is indicated at 138 and is held between the flange 137 and the disc 139. The latter is fastened to and spaced from the flange 137, by means of screws not shown. The disc 139 is similar to 128. The cylindrical housing 66 is again indicated with its flange 67 and the lower wall 68. The sleeve 69 again encircles the sleeve 29 and extends from the wall 68. The plate 80 is again indicated with the cam groove 81 and is fastened to the wall 68 by the screws 82 one of which is shown. The shell 83 again has its upper end fastened to the plate 80 and again extends over the comb plate 21. The duct 85 is again shown extending from the shell 83. The supporting cover is again shown at 88 with its flange 89. The sleeve 91 has its lower end forced into an opening 92 in the cover 88.

The shaft 96 is again supported in the sleeve 91 and has again formed at its lower end the pinion 97 which meshes with the spur gear 65. The flexible shaft 100 is again fastened to the shaft 96. The supporting cover 88 is again provided with the handle 102.

In this modification a pair of grippers are shown each with the disc 105 and the gripper proper 106. A spindle 110 extends from and above each disc 105, and a roller 109 is journaled to the upper face of each of the discs 105.

Referring to Figs. 1 to 10 inclusive, to use the poultry feather picker the comb 20 is brought to bear on the skin of the fowl operated upon, to engage some of the feathers thereof in the spaces $a$, $b$ and $c$ between the teeth 21, by moving the picker so that the feathers will enter said spaces. Suction in the shell 83 helps to locate the feathers of the fowl in said spaces $a$, $b$ and $c$. The drum having the members 30 and 45 is turned by means of the flexible shaft 100 and its appurtences in the direction of the arrow A (see Fig. 2). When the front end 107ª of the foot 107 is about to ride over the spaces $a$, $b$ and $c$ to enclose the feathers of the fowl operated upon between it and the drum having the members 30 and 45, the foot 107 is spaced from the flexible segment 56 located in the cut away portion 55 of the movable member 45. At this instant the bent in portion 49 of the drum functions as a means to lift the feathers to locate them in proper position between the drum and the gripper. When the drum continues to turn in the direction of the arrow A, carrying with it the gripper from the position shown in Fig. 2, to the position indicated in Fig. 6, the gripper is still spaced from the drum. When the drum with its gripper leaves the position indicated in Fig. 6, the foot 107 of the gripper begins to swing in the direction of the arrow B and approaches the outer surface of the drum, closing in thereby the features that extend through the clearances spaced a, b and c, gripping said feathers. Upon further rotation of the drum with the gripper, the movable member 45 of the drum with the gripper rises and pulls the feathers out of the body of the fowl being picked. The drum and gripper continue to turn with the plucked feathers, about half a revolution from the position indicated in Fig. 6. The movable member 45 of the drum then lowers to its original position, by virtue of the tension of the spring 73. In this position by the coaction of the cam groove 81 and the roller 109, the gripper having the foot 107 separates from the drum and thereby the plucked feathers are released and stopped by the vertical member 115 of the stopper. The released feathers are thereby located below the cylindrical duct 85, and suction in said duct draws up the feathers to be deposited into a container not shown.

Referring to Figs. 11 to 18 inclusive the mode of operation of the picker is similar to that already described, and it is to be noted that there are two grippers indicated at 106 which are hinged to the drum 120. The drum as already described has no slidable member, but its ring of flexible material 127 is positioned to function with its two grippers. The ring 138, Fig. 17 also functions with both the grippers and is not integral with the drum 132, and only turns when in frictional engagement with either one of the grippers of this modification. Various modifications may be made in the invention and the present exemplification is to be taken as illustrative and not limitative thereof.

Having described my invention what I desire to secure by Letters Patent and claim is:

1. A poultry feather picker comprising an element to engage portions of the feathers of a fowl operated upon, means to maintain said portions of feathers in said element for an interval of time, a rotating drum journaled in said picker having said means hinged thereto, said means and drum coacting to grip said portions of feathers and pull them from the fowl, and also coacting to release said portions of feathers.

2. A poultry feather picker comprising an element to engage portions of the feathers of a fowl operated upon, a gripper to maintain said portions of feathers in said element for an interval of time, a rotating drum journaled in said picker having said gripper hinged thereto, means for effecting the coaction of said gripper and drum to grip said portions of feathers for an interval of time and also to release them.

3. A poultry feather picker comprising an element to engage portions of the feathers of a fowl operated upon, a rotating drum journaled in the picker, a slidable member in the drum, a gripper hinged to said slidable member, means to move said slidable member, means to swing said gripper to grip said portions of feathers between it and the drum and means to release said portions of feathers.

4. In a poultry feather picker the combination of a comb to engage portions of the feathers of a fowl adjacent to the skin thereof, a drum journaled in the picker, a slidable member in the drum, means to move said slidable member, a gripper hinged to said slidable member, means to swing said gripper to grip said portions of feathers between it and the drum and means to release said portions of feathers.

5. In a feather picker the combination of a comb to engage portions of the feathers of a fowl operated upon adjacent to the skin thereof, a drum journaled in the picker, a slidable member in the drum, means to move said slidable member, a gripper hinged to the upper portion of said slidable member, said gripper extending downwardly from the upper portion of the drum, means to swing said gripper from the drum to secure a clearance space for the feathers operated upon during the different positions of the gripper, said gripper coacting with the drum to grip said portions of feathers and also to release them.

6. In a feather picker the combination of a comb to engage portions of the feathers of a fowl operated upon, a drum journaled in the picker, a slidable member in the drum, means to move said slidable member in the direction of the longitudinal axis of the drum, a gripper hinged to the upper portion of said slidable member, said gripper extending downwardly from the upper portion of the drum, means to swing said gripper from the drum to secure a clearance space for the feathers during the different positions of the gripper, said gripper coacting with the drum to grip said portions of feathers and a stopper extending up from the comb to stop the feathers being carried by the drum and gripper after being released.

7. In a feather picker the combination of a comb to engage feathers operated upon, a drum journaled in the picker, a slidable member in the drum, means to move said slidable member, a gripper hinged to said slidable member, means to swing said gripper to grip said feathers between it and the drum, means to release said feathers, means to interrupt the movement of said feathers imparted thereto by the rotation of the drum and suction means to discharge the feathers from the picker.

8. In a feather picker the combination of a comb to engage feathers operated upon, a rotating drum journaled in the picker, a flexible element carried on the drum, a gripper hinged to the drum, means to swing said gripper relatively to the drum to grip said feathers between it and the said flexible element, and means to release said feathers.

9. In a feather picker the combination of a comb to engage feathers operated upon, a rotating drum journaled in the picker having a bent in portion to lift the feathers operated upon into position for gripping, a gripper adapted to swing hinged to the drum to grip said feathers between it and the drum, and means to release said feathers.

10. In a feather picker the combination of a comb to engage feathers operated upon, a rotating drum journaled in the picker, a gripper adapted to swing relatively to the drum to grip said feathers, a shell supported in the picker surrounding the drum and gripper, said shell having an inlet opening over the teeth of the comb; and means to release said feathers.

11. In a feather picker the combination of a comb, a stationary stem extending up from the comb, a sleeve journaled upon said stem, a drum comprising a relatively stationary member and a slidable member, said relatively stationary member fastened to said sleeve, a flexible element carried by the slidable member of the drum, a spur gear fastened to said sleeve, a stationary housing having a sleeve encircling the first sleeve, a cam located inside of the drum and fastened to the second sleeve, a roller journaled to the slidable member of the drum coacting with said cam, a cam plate having a cam groove, fastened to the housing, a gripper hinged to the slidable member of the drum, a roller journaled on the gripper coacting with said cam groove, a stopper supported on the comb plate coacting with said gripper and drum, a shell, having an inlet opening, with its upper end fastened to the cam plate and its lower edge encircling the comb plate, a discharge duct extending up from the shell, a supporting cover fastened to said housing, said cover securing the upper portion of the stationary stem, a handle extending from said supporting cover, a sleeve extending from an opening in the said cover, a driving shaft journaled in the latter sleeve, a pinion extending from one end of the driving shaft meshing with said spur gear, and a flexible shaft fastened to the other end of the driving shaft.

12. In a picker the combination of a comb plate adapted to bear on the skin of a fowl operated upon, a rotating element journaled above the comb plate, and a gripper hinged to the upper portion of said element, said gripper having a foot spaced from its upper portion to provide a clearance space for feathers operated upon and enable them to be located between said element and the gripper, and to be released from said element and gripper.

13. A poultry feather picker comprising a comb to engage portions of the feathers of a fowl operated upon, a rotating drum journaled in the picker, a gripper hinged to the drum, means for effecting the coaction of said gripper and drum to grip said portions of feathers for an interval of time and also to release them and suction means connected to the picker to draw the feathers into the spaces of said comb.

Signed at the borough of Brooklyn, city of New York, in the county of Kings and State of New York, this 7th day of April, A. D. 1928.

GEORGE A. SCOTT.